US010912061B2

(12) United States Patent
Cao et al.

(10) Patent No.: US 10,912,061 B2
(45) Date of Patent: Feb. 2, 2021

(54) METHOD AND APPARATUS FOR SEMI-PERSISTENT SCHEDULING

(71) Applicant: Huawei Technologies Co., Ltd., Shenzhen (CN)

(72) Inventors: Zhenzhen Cao, Beijing (CN); Bo Lin, Beijing (CN); Jie Ma, Beijing (CN); Yongqiang Gao, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/269,520

(22) Filed: Sep. 19, 2016

(65) Prior Publication Data
US 2017/0019881 A1  Jan. 19, 2017

Related U.S. Application Data

(63) Continuation of application No. PCT/CN2014/073716, filed on Mar. 19, 2014.

(51) Int. Cl.
*H04W 72/04* (2009.01)
*H04W 76/14* (2018.01)
*H04W 76/30* (2018.01)

(52) U.S. Cl.
CPC ........... *H04W 72/04* (2013.01); *H04W 76/14* (2018.02); *H04W 76/30* (2018.02)

(58) Field of Classification Search
USPC ....... 370/329, 252, 280, 328, 336, 230, 235, 370/236, 241, 242, 281, 311, 326, 331,
(Continued)

(56) References Cited

U.S. PATENT DOCUMENTS

2011/0059749 A1   3/2011 Hefner et al.
2012/0020393 A1*  1/2012 Patil ...................... H04W 76/38
                                                    375/222
(Continued)

FOREIGN PATENT DOCUMENTS

CN   102026410 A   4/2011
CN   102378302 A   3/2012
(Continued)

OTHER PUBLICATIONS

"3rd Generation Partnership Project; Technical Specification Group Radio Access Network; Evolved Universal Terrestrial Radio Access (E-UTRA); Medium Access Control (MAC) protocol specification (Release 12)," 3GPP TS 36.321, V12.0.0, pp. 1-57, 3rd Generation Partnership Project, Valbonne, France (Dec. 2013).

(Continued)

*Primary Examiner* — Phuongchau Ba Nguyen
(74) *Attorney, Agent, or Firm* — Leydig, Voit & Mayer, Ltd.

(57) ABSTRACT

Embodiments of the present disclosure provide a method and an apparatus for semi-persistent scheduling (SPS). The method for semi-persistent scheduling includes: interacting, by a first user equipment, with a base station to obtain an SPS resource allocated by the base station; performing, by the first user equipment, device-to-device (D2D) communication with second user equipment by using the SPS resource; and after the D2D communication ends, sending, by the first user equipment, release indication information to the base station, so that the base station releases the SPS resource. In embodiments of the present disclosure, after D2D communication ends, the first user equipment sends a release indication message to a base station, so that the base station can release an SPS resource, preventing waste of resources.

16 Claims, 3 Drawing Sheets

(58) Field of Classification Search
USPC ............ 370/337, 395.3, 437, 442, 476, 498
See application file for complete search history.

(56) References Cited

U.S. PATENT DOCUMENTS

| | | | |
|---|---|---|---|
| 2013/0150061 A1* | 6/2013 | Shin .................. | H04W 4/70 455/450 |
| 2013/0155894 A1 | 6/2013 | Li et al. | |
| 2013/0322413 A1* | 12/2013 | Pelletier ............ | H04W 76/14 370/336 |
| 2014/0023008 A1* | 1/2014 | Ahn .................. | H04L 5/006 370/329 |
| 2014/0105178 A1* | 4/2014 | Jang ................. | H04W 76/23 370/331 |
| 2014/0161069 A1* | 6/2014 | Ohta ................. | H04W 72/1263 370/329 |
| 2015/0078279 A1 | 3/2015 | Ko et al. | |
| 2015/0173048 A1* | 6/2015 | Seo ................... | H04W 72/1247 370/329 |
| 2016/0183219 A1* | 6/2016 | Kim ................... | H04W 72/0406 370/329 |
| 2017/0208577 A1* | 7/2017 | Novak ................ | H04L 1/1861 |

FOREIGN PATENT DOCUMENTS

| | | | |
|---|---|---|---|
| CN | 102984699 | A | 3/2013 |
| CN | 103533500 | A | 1/2014 |
| EP | 2658330 | A1 | 10/2013 |
| KR | 20120074254 | A | 7/2012 |
| RU | 2012113862 | A | 10/2013 |
| WO | 2013038525 | A1 | 3/2013 |
| WO | WO 2013149665 | A1 | 10/2013 |
| WO | 2013191360 | A1 | 12/2013 |

OTHER PUBLICATIONS

"3$^{rd}$ Generation Partnership Project; Technical Specification Group Radio Access Network; Evolved Universal Terrestrial Radio Access (E-UTRA); Radio Resource Control (RRC) Protocol specification (Release 12)," 3GPP TS 36.331, V12.0.0, pp. 1-349, 3$^{rd}$ Generation Partnership Project, Valbonne, France (Dec. 2013).

"Resource allocation for D2D communication," 3GPP TSG-RAN WG2 Meeting #85, Prague, Czech Republic, R2-140693, 3rd Generation Partnership Project, Valbonne, France (Feb. 10-14, 2014).

EP 14885910.1, Office Action, dated Feb. 21, 2018.

* cited by examiner

METHOD AND APPARATUS FOR SEMI-PERSISTENT SCHEDULING

CROSS-REFERENCE TO RELATED APPLICATIONS

This application is a continuation of International Patent Application No. PCT/CN2014/073716, filed on Mar. 19, 2014, the disclosure of which is hereby incorporated by reference in its entirety.

TECHNICAL FIELD

The present disclosure relates to communication technologies and, in particular, to a method and an apparatus for semi-persistent scheduling (SPS).

BACKGROUND

In a Long Term Evolution (LTE) communication system, semi-persistent scheduling (SPS) allows a radio resource to be configured in a semi-persistent manner and periodically allocates the resource to specified user equipment (UE). SPS applies to a service that needs to be periodically scheduled, for example, a voice service.

In the known solution, a base station schedules, in an SPS manner, UE to send voice data. When the UE requests to transmit the voice data, the base station allocates an SPS resource to the UE. After transmission of the voice data of the UE ends, the UE sends a padding message to the base station through the SPS resource. When a quantity of times that the base station receives the padding message sent by the UE is greater than or equal to a preset quantity of times, the base station determines that the transmission of the voice data of the UE ends and releases the SPS resource allocated to the UE.

However, in a device-to-device (D2D) communication scenario, using an SPS method in the known solution leads to waste of resources.

SUMMARY

Embodiments of the present disclosure provide a method and an apparatus for semi-persistent scheduling SPS.

An embodiment of the present disclosure provides a method for semi-persistent scheduling SPS, including:

interacting, by first user equipment, with a base station to obtain an SPS resource allocated by the base station;

performing, by the first user equipment, device-to-device (D2D) communication with second user equipment by using the SPS resource; and after the D2D communication ends, sending, by the first user equipment, release indication information to the base station, so that the base station releases the SPS resource.

An embodiment of the present disclosure further provides a method for semi-persistent scheduling SPS, including:

interacting, by a base station, with first user equipment to allocate the first user equipment an SPS resource, so that the first user equipment performs device-to-device (D2D) communication with second user equipment by using the SPS resource; and receiving, by the base station, release indication information that is sent by the first user equipment after the D2D communication ends, and releasing the SPS resource.

An embodiment of the present disclosure provides user equipment, including:

an SPS resource obtaining module, configured to interact with a base station to obtain an SPS resource allocated by the base station;

a D2D communication module, configured to perform device-to-device (D2D) communication with second user equipment by using the SPS resource; and an SPS resource releasing module, configured to: after the D2D communication ends, send a release indication message to the base station, so that the base station releases the SPS resource.

An embodiment of the present disclosure provides a base station, including:

an SPS resource allocating module, configured to interact with first user equipment to allocate the first user equipment an SPS resource, so that the first user equipment performs device-to-device (D2D) communication with second user equipment by using the SPS resource; and an SPS resource releasing module, configured to receive a release indication message that is sent by the first user equipment after the D2D communication ends, and release the SPS resource.

According to the method and the apparatus for semi-persistent scheduling SPS in the embodiments of the present disclosure, after D2D communication ends, first user equipment sends a release indication message to a base station, so that the base station can release an SPS resource, preventing waste of resources.

DESCRIPTION OF EMBODIMENTS

To make the objectives, technical solutions, and advantages of the embodiments of the present disclosure clearer, the following clearly describes the technical solutions in the embodiments of the present disclosure with reference to the accompanying drawings in the embodiments of the present disclosure. Apparently, the described embodiments are some but not all of the embodiments of the present disclosure. All other embodiments obtained by a person of ordinary skill in the art based on the embodiments of the present disclosure without creative efforts shall fall within the protection scope of the present disclosure.

Figure 1:
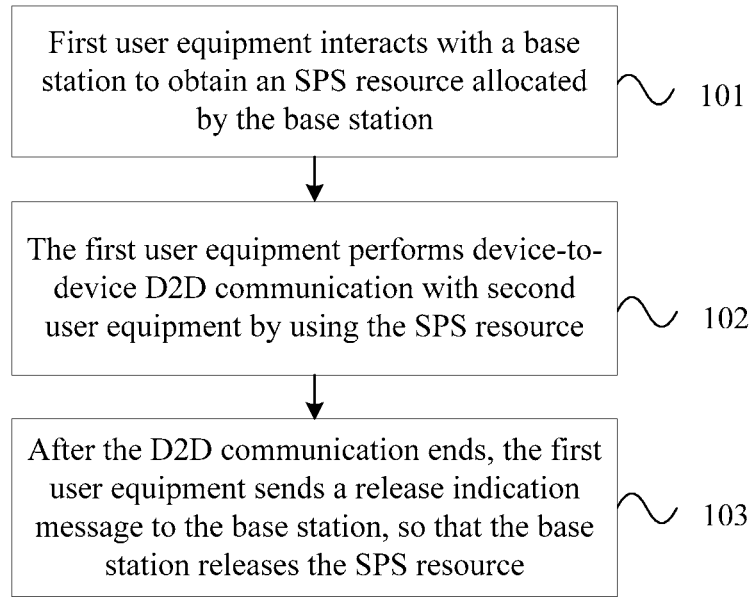
FIG. 1 is a flowchart of Embodiment 1 of a method for semi-persistent scheduling SPS according to the present disclosure.

FIG. 1 is a flowchart of Embodiment 1 of a method for semi-persistent scheduling SPS according to the present disclosure. As shown in FIG. 1, the method in this embodiment may include:

Step 101. A first user equipment interacts with a base station to obtain an SPS resource allocated by the base station.

Step 102. The first user equipment performs device-to-device (D2D) communication with second user equipment by using the SPS resource.

Step 103. After the D2D communication ends, the first user equipment sends a release indication message to the base station, so that the base station releases the SPS resource.

In the known solution, after UE obtains an SPS resource allocated by a base station, the UE sends a padding message to the base station, to notify the base station that the UE no longer needs to use the SPS resource, so that the base station can release the SPS resource allocated to the UE. In the present disclosure, after D2D communication ends, first user equipment sends a release indication message to a base station, so that the base station releases an SPS resource.

In the known solution, after first user equipment obtains an SPS resource allocated by a base station, the first user equipment sends a padding message to the base station, to notify the base station that the first user equipment no longer needs to use the SPS resource, so that the base station can release the SPS resource allocated to the first user equipment. If the first user equipment uses the SPS resource allocated by the base station to perform D2D communication with second user equipment, after the D2D communication ends, the first user equipment sends a padding message to the second user equipment and the base station cannot receive the padding message sent by the first user equipment. As a result, the base station cannot release the SPS resource, causing waste of resources. In the present disclosure, after D2D communication ends, first user equipment sends a release indication message to a base station, so that the base station can release an SPS resource, preventing waste of resources.

Figure 2:
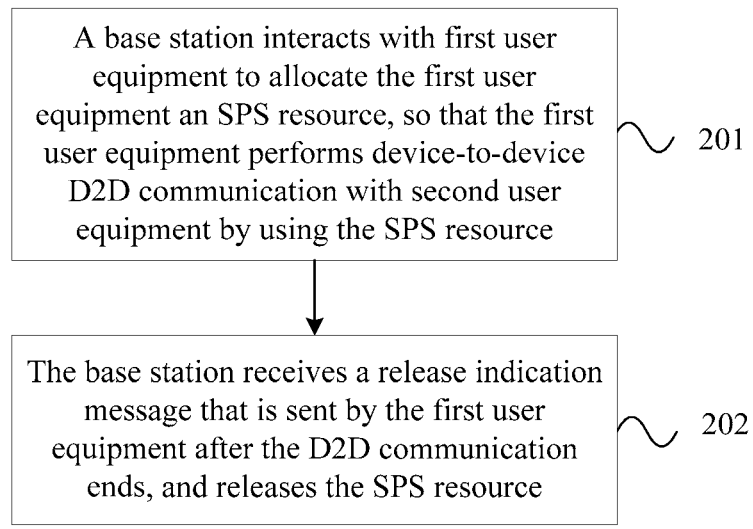
FIG. 2 is a flowchart of Embodiment 2 of a method for semi-persistent scheduling SPS according to the present disclosure.

FIG. 2 is a flowchart of Embodiment 2 of a method for semi-persistent scheduling SPS according to the present disclosure. As shown in FIG. 2, the method in this embodiment may include:

Step 201. A base station interacts with first user equipment to allocate the first user equipment an SPS resource, so that the first user equipment performs device-to-device (D2D) communication with second user equipment by using the SPS resource.

Step 202. The base station receives a release indication message that is sent by the first user equipment after the D2D communication ends, and releases the SPS resource.

In the known solution, after a base station allocates UE an SPS resource, the base station learns that the UE no longer needs to use the SPS resource if the base station receives a padding message sent by the UE, and therefore releases the SPS resource allocated to the UE. In the present disclosure, a base station releases an SPS resource if the base station receives a release indication message sent by first user equipment after D2D communication ends.

In the known solution, after a base station allocates first user equipment an SPS resource, the base stations learns that the first user equipment no longer needs to use the SPS resource if the base station receives a padding message sent by the first user equipment, and therefore releases the SPS resource allocated to the first user equipment. Therefore, if the first user equipment uses the SPS resource allocated by the base station to perform D2D communication with second user equipment, after the D2D communication ends, the first user equipment sends a padding message to the second user equipment and the base station cannot receive the padding message sent by the first user equipment. As a result, the base station cannot release the SPS resource, causing waste of resources. In the present disclosure, a base station receives a release indication message sent by first user equipment after D2D communication ends, so that the base station can release an SPS resource, preventing waste of resources.

Figure 3:
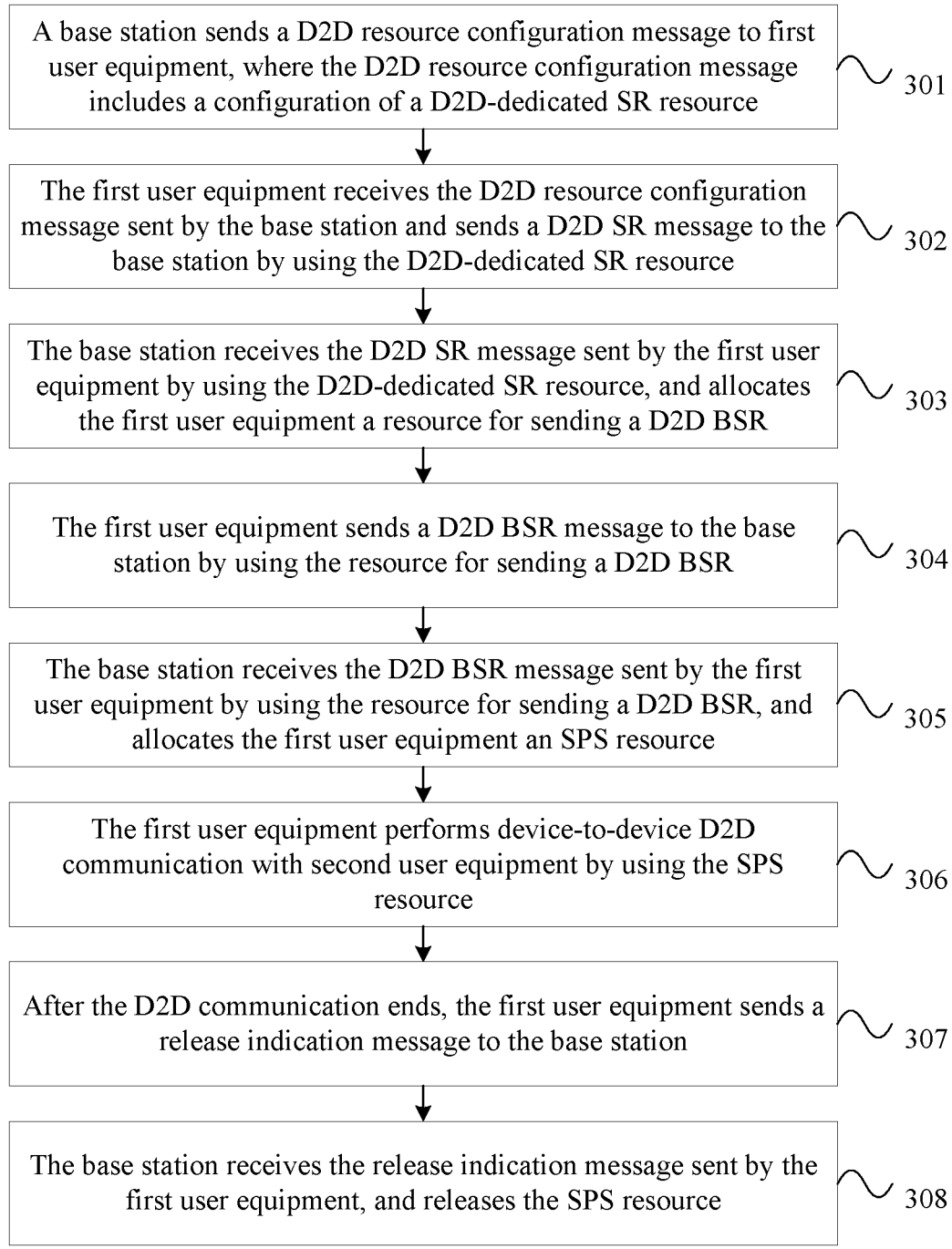
FIG. 3 is a flowchart of Embodiment 3 of a method for semi-persistent scheduling SPS according to the present disclosure.

FIG. 3 is a flowchart of Embodiment 3 of a method for semi-persistent scheduling SPS according to the present disclosure. As shown in FIG. 3, the method in this embodiment may include:

Step 301. A base station sends a D2D resource configuration message to first user equipment, where the D2D resource configuration message includes a configuration of a D2D-dedicated scheduling request (SR) resource.

The D2D-dedicated SR resource includes a physical uplink control channel (PUCCH) resource or a physical random access channel (PRACH) resource.

Step 302. The first user equipment receives the D2D resource configuration message sent by the base station and sends a D2D SR message to the base station by using the D2D-dedicated SR resource.

Specifically, the first user equipment receives the D2D resource configuration message sent by the base station, obtains the configuration of the D2D-dedicated SR resource, and sends the D2D SR message to the base station by using the D2D-dedicated SR resource when only D2D data transmission exists.

The D2D SR message has same content as an SR message in the known solution but is carried by a different resource, that is, the D2D SR message is carried by the D2D-dedicated SR resource.

It should be noted that, when the first user equipment needs to transmit cellular data, the first user equipment does not send the D2D SR message to the base station by using the D2D-dedicated SR resource.

Step 303. The base station receives the D2D SR message sent by the first user equipment by using the D2D-dedicated SR resource, and allocates the first user equipment a resource for sending a D2D buffer status report (BSR).

Specifically, when the base station receives the D2D SR message sent by the first user equipment by using the D2D-dedicated SR resource, it indicates that the first user equipment performs only D2D data transmission, and the base station allocates the first user equipment the resource for sending a D2D BSR.

In the known solution, when a base station receives an SR message sent by UE, even if the SR message sent by the UE is an SR message sent when only D2D data transmission exists, because the base station cannot determine whether the UE needs to send cellular data or D2D data, the base station allocates the UE a resource according to a preset value. Because the preset value may be greater than a size of resource actually occupied by a D2D BSR message, waste of resources may occur. In the present disclosure, when receiving a D2D SR message sent by first user equipment by using a D2D-dedicated SR resource, a base station may determine that the UE needs to send D2D data, and therefore allocates the first user equipment a resource for sending a D2D BSR. A size of the allocated resource may match a resource actually occupied by a D2D BSR message, thereby preventing waste of resources.

Step 304. The first user equipment sends a D2D BSR message to the base station by using the resource for sending a D2D BSR.

Step 305. The base station receives the D2D BSR message sent by the first user equipment by using the resource for sending a D2D BSR, and allocates the first user equipment an SPS resource.

Optionally, when the base station determines, according to a logical channel group ID in the D2D BSR message sent by the first user equipment, that voice data is waiting to be transmitted by the first user equipment, the base station activates an SPS configuration of the first user equipment and allocates the first user equipment the SPS resource.

Step 306. The first user equipment performs device-to-device (D2D) communication with second user equipment by using the SPS resource.

Step 307. After the D2D communication ends, the first user equipment sends a release indication message to the base station.

Optionally, the release indication message includes a media access control (MAC) layer message and a radio resource management (RRC) layer message.

Optionally, the release indication message is carried in a control element of the MAC layer message; or the release indication message is carried in a subpackage header of the MAC layer message, where the MAC-layer control element includes a MAC-layer BSR.

Optionally, the release indication message includes at least one of the following content: an identifier indicating whether to release the SPS resource, whether the identifier is a D2D communication identifier, and a serial number of the SPS resource to be released.

Step 308. The base station receives the release indication message sent by the first user equipment, and releases the SPS resource.

Optionally, before step 308, the method may further include: the first user equipment detects whether there is data to be sent; and when it is determined that a quantity of times that it is detected that there is no data to be sent is greater than or equal to a first threshold, the first user equipment sends release indication information to the base station; or when a quantity of times that the first user equipment sends a padding message to the second user equipment is greater than or equal to a first threshold, the first user equipment sends release indication information to the base station.

The first threshold may be preset by a user or configured on the base station.

Optionally, the D2D resource configuration message in step 301 may further include a configuration of a D2D SPS release indication resource, so that the first user equipment sends the release indication information to the base station by using the D2D SPS release indication resource.

The D2D SPS release indication resource may be a PUCCH resource or a PRACH resource.

Optionally, the D2D resource configuration message in step 301 may further include the first threshold.

Preferably, when receiving the D2D SR message sent by the first user equipment by using the D2D-dedicated SR resource, the base station may further allocates the first user equipment a resource for sending an identifier of a communication group to which the first user equipment belongs. The first user equipment sends the identifier of the communication group to which the first user equipment belongs by using the resource for sending the identifier of the communication group. The base station receives a message that indicates the identifier of the communication group to which the first user equipment belongs and that is sent by the first user equipment by using the resource for sending the identifier of the communication group, determines to allocate the first user equipment the SPS resource, and determines a location of the SPS resource.

An identifier of a communication group to which UE belongs determines information about the communication group to which the UE belongs (for example, a first police group and a first fire fighting group). The base station may allocate resources at different positions according to different communication group identifiers, thereby preventing data collision between communication group members.

In this embodiment of the present disclosure, a base station receives a D2D SR message sent by first user equipment by using a D2D-dedicated SR resource and allocates the first user equipment a resource for sending a D2D BSR, so that a size of the resource that is for sending a BSR and allocated by the base station is a size of a resource actually occupied by the D2D BSR, further preventing waste of resources.

Figure 4:
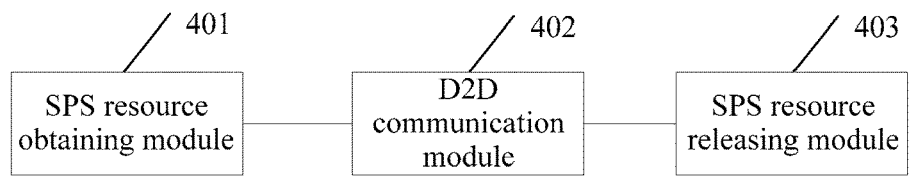
FIG. 4 is a schematic structural diagram of Embodiment 1 of user equipment according to the present disclosure.

FIG. 4 is schematic structural diagram of Embodiment 1 of user equipment according to the present disclosure. As shown in FIG. 4, the user equipment in this embodiment may include an SPS resource obtaining module 401, a D2D communication module 402 and an SPS resource releasing module 403. The SPS resource obtaining module 401 is configured to interact with a base station to obtain an SPS resource allocated by the base station. The D2D communication module 402 is configured to perform device-to-device (D2D) communication with second user equipment by using the SPS resource. The SPS resource releasing module 403 is configured to: after the D2D communication ends, send a release indication message to the base station, so that the base station releases the SPS resource.

The user equipment in this embodiment may be used to execute the technical solution of the method embodiment shown in FIG. 1. The implementation principles and technical effects are similar, and are not described herein again.

Figure 5:
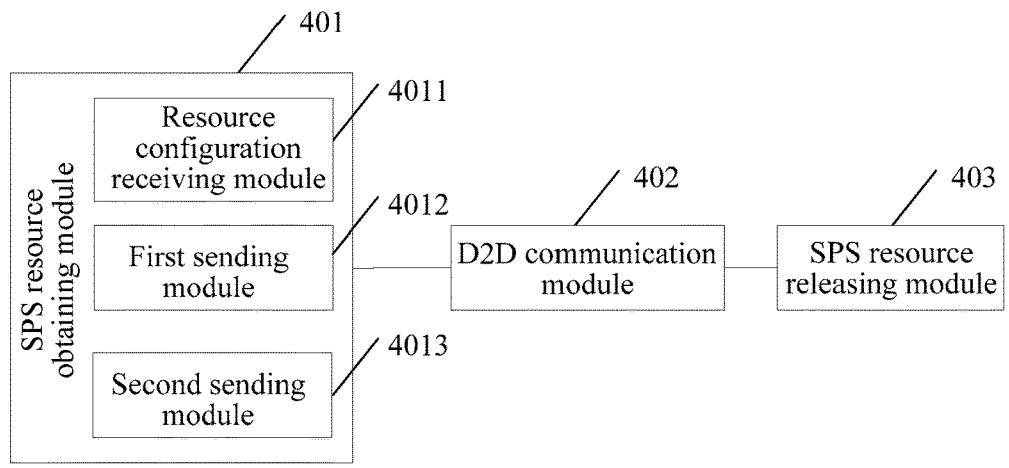
FIG. 5 is a schematic structural diagram of Embodiment 2 of user equipment according to the present disclosure.

FIG. 5 is schematic structural diagram of Embodiment 2 of user equipment according to the present disclosure. As shown in FIG. 5, the user equipment in this embodiment is based on a structure of the user equipment shown in FIG. 4. Further, the SPS resource obtaining module 401 may include a first sending module 4012 and a second sending module 4013. The first sending module 4012 is configured to send an SR message to the base station, so that the base station allocates the first user equipment a resource for sending a BSR. The second sending module 4013 is configured to send a BSR message to the base station by using the resource for sending a BSR, so that the base station allocates the first user equipment the SPS resource.

Further, the SPS resource obtaining module 401 may further include: a resource configuration receiving module 4011, configured to receive a D2D resource configuration message sent by the base station, where the D2D resource configuration message includes a configuration of a D2D-dedicated SR resource. The first sending module 4012 is specifically configured to send a D2D SR message to the base station by using the D2D SR resource received by the resource configuration receiving module 4011, so that the base station allocates the first user equipment a resource for sending a D2D BSR. The second sending module 4013 is specifically configured to send a D2D BSR message to the base station by using the resource for sending a D2D BSR, so that the base station allocates the first user equipment the SPS resource.

The user equipment in this embodiment may be used to execute the technical solution of the first user equipment in the method embodiment shown in FIG. 3. The implementation principles and technical effects are similar, and are not described herein again.

Figure 6:
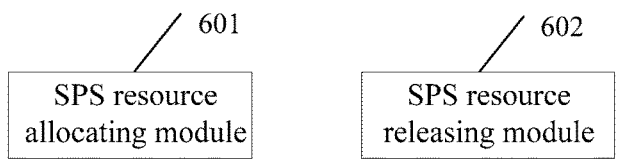
FIG. 6 is a schematic structural diagram of Embodiment 1 of a base station according to the present disclosure.

FIG. 6 is a schematic structural diagram of Embodiment 1 of a base station according to the present disclosure. As shown in FIG. 6, the base station in this embodiment may include an SPS resource allocating module 601 and an SPS resource releasing module 602. The SPS resource allocating module 601 is configured to interact with first user equipment to allocate the first user equipment an SPS resource, so that the first user equipment performs device-to-device (D2D) communication with second user equipment by using the SPS resource. The SPS resource releasing module 602 is configured to receive a release indication message that is sent by the first user equipment after the D2D communication ends, and release the SPS resource.

The base station in this embodiment may be used to execute the technical solution of the method embodiment shown in FIG. 2. The implementation principles and technical effects are similar, and are not described herein again.

Figure 7:
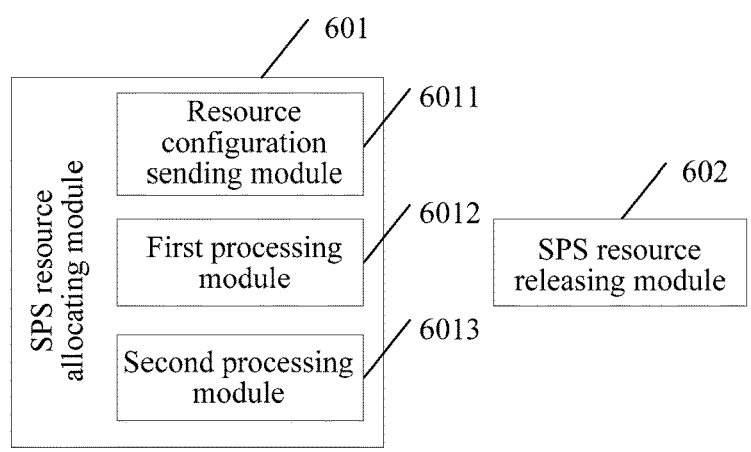
FIG. 7 is a schematic structural diagram of Embodiment 2 of a base station according to the present disclosure.

FIG. 7 is a schematic structural diagram of Embodiment 2 of a base station according to the present disclosure. As shown in FIG. 7, the base station in this embodiment is based on a structure of the base station shown in FIG. 6. Further, the SPS resource allocating module 601 may include a first processing module 6012 and a second processing module 6013. The first processing module 6012 is configured to receive an SR message sent by the first user equipment, and allocate the first user equipment a resource for sending a BSR. The second processing module 6013 is configured to receive a BSR message sent by the first user equipment by using the resource for sending a BSR, and allocate the first user equipment the SPS resource.

Further, the SPS resource allocating module 601 may further include: a resource configuration sending module 6011, configured to send a D2D resource configuration message to the first user equipment, where the D2D resource configuration message includes a configuration of a D2D-dedicated SR resource. The first processing module 6012 is specifically configured to receive a D2D SR message sent by the first user equipment by using the D2D SR resource, and allocate the first user equipment a resource for sending a D2D BSR. The second processing module 6013 is specifically configured to receive a D2D BSR message sent by the first user equipment by using the resource for sending a D2D BSR, and allocate the first user equipment the SPS resource.

The base station in this embodiment may be used to execute the technical solution of the base station in the method embodiment shown in FIG. 2. The implementation principles and technical effects are similar, and are not described herein again.

A person of ordinary skill in the art may understand that all or some of the steps of the method embodiments may be implemented by a program instructing related hardware. The program may be stored in a computer-readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present disclosure.

What is claimed is:

1. A method for semi-persistent scheduling (SPS), the method comprising:
   receiving, by a base station, an identifier of a communication group to which a first user equipment belongs from the first user equipment by using a device-to-device (D2D)-dedicated resource;
   determining, by the base station, a SPS resource according to the identifier of the communication group by comparing to a preset value;
   sending, by the base station, a configuration of the SPS resource to the first user equipment, wherein the configuration allows for the first user equipment to perform D2D communication with a second user equipment by using the SPS resource;
   receiving, by the base station, a release indication message from the first user equipment; and
   in response to receiving the release indication message, releasing, by the base station, the SPS resource.

2. The method according to claim 1, further comprising:
   receiving, by the base station, a scheduling request (SR) message from the first user equipment; and
   in response to receiving the SR message, sending, by the base station, a configuration of the D2D-dedicated resource for sending the identifier;
   wherein receiving, by the base station, the identifier from the first user equipment comprises:
   receiving, by the base station, the identifier from the first user equipment by using the D2D-dedicated resource for sending the identifier.

3. The method according to claim 1, wherein the release indication message is a radio resource management (RRC) layer message.

4. The method according to claim 1, further comprising:
   sending, by the base station, a configuration of a resource for sending the release indication message to the first user equipment;
   wherein receiving, by the base station, the release indication message from the first user equipment comprises:
   receiving, by the base station, the release indication message from the first user equipment by using the resource for sending the release indication message.

5. A method for semi-persistent scheduling (SPS), the method comprising:
   sending, by first user equipment, an identifier of a communication group identifier to which the first user equipment belongs to a base station by using a device-to-device (D2D)-dedicated resource, wherein the identifier allows for the base station to determine a SPS resource according to the identifier by comparing to a preset value;
   receiving, by the first user equipment, a configuration of the SPS resource from the base station;
   performing, by the first user equipment, D2D communication with a second user equipment by using the SPS resource; and
   in response to ending performing D2D communication, sending, by the first user equipment, a release indication message to the base station, wherein the release indication message notifies the base station to release the SPS resource.

6. The method according to claim 5, further comprising:
sending, by the first user equipment, a scheduling request (SR) message to the base station, wherein the SR message notifies the base station to allocate the first user equipment the D2D-dedicated resource for sending the identifier; and
receiving, by the first user equipment, a configuration of the D2D-dedicated resource for sending the identifier from the base station;
wherein sending, by the first user equipment, the identifier to the base station comprises:
sending, by the first user equipment, the identifier to the base station by using the D2D-dedicated resource for sending the identifier.

7. The method according to claim 5, wherein the release indication message is a radio resource management (RRC) layer message.

8. The method according to claim 5, further comprising:
receiving, by the first user equipment, a configuration of a resource for sending the release indication message from the base station;
wherein sending, by the first user equipment, the release indication message to the base station comprises:
sending, by the first user equipment, the release indication message to the base station by using the resource for sending the release indication message.

9. An apparatus for semi-persistent scheduling (SPS), the apparatus comprising:
a non-transitory memory storage comprising instructions; and
a processor in communication with the non-transitory memory storage, wherein the processor executes the instructions to:
receive an identifier of a communication group to which a first user equipment belongs from the first user equipment by using a device-to-device (D2D)-dedicated resource;
determine a SPS resource according to the identifier of the communication group by comparing to a preset value;
send a configuration of the SPS resource to the first user equipment, wherein the configuration allows for the first user equipment to perform D2D communication with a second user equipment by using the SPS resource;
receive a release indication message from the first user equipment; and
in response to receiving the release indication message, release the SPS resource.

10. The apparatus according to claim 9, wherein the processor further executes the instructions to:
receive a scheduling request (SR) message from the first user equipment; and
in response to receiving the SR message, send a configuration of the D2D-dedicated resource for sending the identifier;
wherein receiving the identifier from the first user equipment comprises:
receiving the identifier from the first user equipment by using the D2D-dedicated resource for sending the identifier.

11. The apparatus according to claim 9, wherein the release indication message is a radio resource management (RRC) layer message.

12. The apparatus according to claim 9, wherein the processor further executes the instructions to:
send a configuration of a resource for sending the release indication message to the first user equipment;
wherein receiving the release indication message from the first user equipment comprises:
receiving the release indication message from the first user equipment by using the resource for sending the release indication message.

13. An apparatus for semi-persistent scheduling (SPS), the apparatus comprising:
a non-transitory memory storage comprising instructions; and
a processor in communication with the non-transitory memory storage, wherein the processor executes the instructions to:
send an identifier of a communication group identifier to which the first user equipment belongs to a base station by using a device-to-device (D2D)-dedicated resource, wherein the identifier allows for the base station to determine a SPS resource according to the identifier by comparing to a preset value;
receive a configuration of the SPS resource from the base station;
perform D2D communication with a second user equipment by using the SPS resource; and
in response to performing D2D communication ending, send a release indication message to the base station, wherein the release indication message notifies the base station to release the SPS resource.

14. The apparatus according to claim 13, wherein the processor further executes the instructions to:
send a scheduling request (SR) message to the base station, wherein the SR message notifies the base station to allocate the first user equipment the D2D-dedicated resource for sending the identifier; and
receive a configuration of the D2D-dedicated resource for sending the identifier from the base station;
wherein sending the identifier to the base station comprises:
sending the identifier to the base station by using the D2D-dedicated resource for sending the identifier.

15. The apparatus according to claim 13, wherein the release indication message is a radio resource management (RRC) layer message.

16. The apparatus according to claim 13, wherein the processor further executes the instructions to:
receive, from the base station, a configuration of a resource for sending the release indication message to the base station;
wherein sending the release indication message to the base station comprises:
sending the release indication message to the base station by using the resource for sending the release indication message.

* * * * *